May 8, 1962  R. G. JEWELL  3,033,318
FLEXIBLE CONNECTING DEVICE
Filed Dec. 29, 1960

*INVENTOR.*
RICHARD G. JEWELL
BY *Richard E. Hosley*

HIS ATTORNEY

United States Patent Office 3,033,318
Patented May 8, 1962

3,033,318
FLEXIBLE CONNECTING DEVICE
Richard G. Jewell, Swampscott, Mass., assignor to General Electric Company, a corporation of New York
Filed Dec. 29, 1960, Ser. No. 79,254
11 Claims. (Cl. 188—1)

The present invention relates to flexible connecting devices for interconnecting parts subject to relative vibratory movement and more particularly to flexible connecting devices having damping means associated therewith for preventing excessive vibration.

It is quite common to mount sensitive instruments and control equipment on flexible supports known in the art as shock mounts in order to insulate such equipment from vibration. For example, on aircraft it is common to mount sensitive instruments and control equipment on shock mounts to protect them from vibration caused by the aircraft engines, which vibration would otherwise adversely affect the operation of and occasionally damage such equipment because of acceleration forces. Because these shock mounts necessarily permit relative movement between the shock-mounted equipment and the aircraft frame on which it is mounted, it is necessary to connect the equipment to other relatively stationary equipment secured to the airframe by flexible connectors. These connectors are likely to vibrate excessively, particularly at resonant frequencies, and such excessive vibration sometimes causes structural failure due to fatigue of the material of which the connector is formed. This problem has been found to be particularly troublesome where tubular connectors are used to conduct gas under pressure to flexible bellows forming a part of shock-mounted control equipment.

Accordingly, it is an object of the present invention to provide an improved flexible connector having vibration damping means associated therewith which functions to prevent excessive vibration and resulting failure of the connector.

Another object of the invention is to provide a simple, yet effective vibration damping arrangement for damping vibration of flexible curved tubes and other flexible connectors used to interconnect parts subject to relative vibratory movement.

Further objects and advantages of the invention will become apparent as the following description proceeds.

Briefly, in accordance with this invention, there is provided a flexible, resilient connector which, in one illustrated embodiment, is a spiral tubular conduit adapted to interconnect a shock-mounted flexible bellows and a relatively stationary fluid conduit. Vibration of the spiral conduit is damped by use of a plurality of juxtaposed vibration dampers mounted along the length of at least a part of the conduit subject to vibration. The dampers are loosely mounted on the conduit and spaced from each other so as to permit impact and frictional engagement between each damper and the conduit and also between adjacent dampers. In this way the kinetic energy of the conduit due to induced vibrations is dissipated, and excessive vibration of the conduit likely to cause structural failure is effectively reduced in a simple and inexpensive manner.

For a better understanding of the invention, reference should be made to the following detailed description taken in connection with the accompanying drawings in which.

Figure 1:
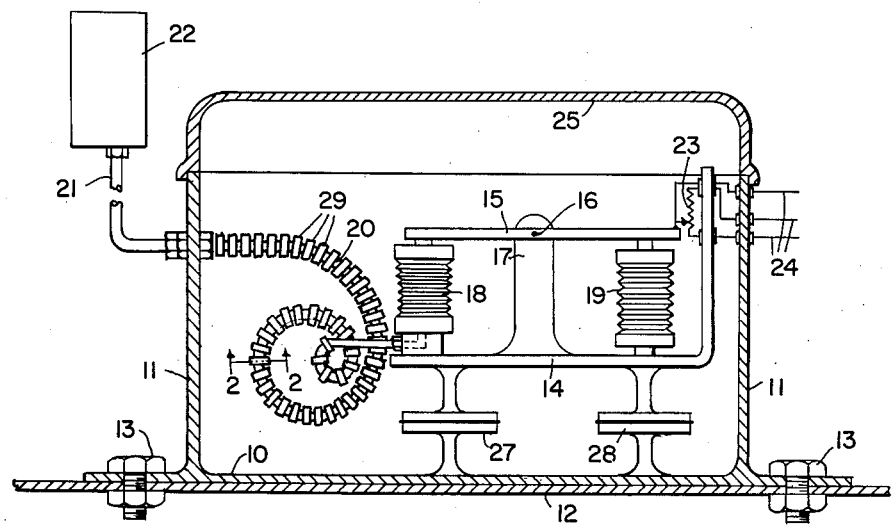
FIG. 1 shows shock-mounted control equipment comprising a flexible bellows connected to a relatively stationary conduit by a spiral resilient conduit provided with vibration damping means constructed in accordance with the present invention.
Figure 2:
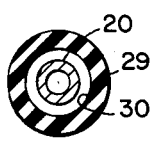
FIG. 2 is a cross-section view taken along section line 2—2 of FIG. 1.

Referring to FIG. 1 of the drawing, the flexible connecting device forming the subject matter of the present invention is illustrated, for the purpose of illustrating one application, as being utilized in connection with a primary pressure-sensing device of a type used on aircraft to provide a pressure indication or control signal. Such devices may be used, for example, to provide a pressure signal indicative of a pressure condition in a jet engine used to propel the aircraft. As shown, the pressure-sensing device is mounted in a housing having a base 10 and side walls 11, the housing being secured to a frame 12 normally forming a part of the aircraft by suitable fastening devices such as screws 13. Supported within the housing on a platform 14 is a pressure-measuring device of the so-called force balance type. This device has a balance lever 15 pivoted at 16 on a supporting arm 17 extending upwardly from platform 14, the balance arm being engaged at opposite ends by bellows devices 18 and 19 which are also supported on the platform 14.

The bellows 18 is connected by means of a curved tube 20 to a stationary fluid conduit 21 normally attached to the aircraft frame, this conduit being, in turn, coupled to a device 22, the pressure of which is to be measured. The device 22 may, for example, be the pressure chamber of a jet engine. In order to permit freedom of movement of platform 14 and the equipment mounted thereon, the tube is made of flexible resilient metal appropriately curved to allow relative movement between ends of the tube. As shown, the tube 20 is curved to form a spiral but it may have any desired configuration. The bellows 19 is evacuated and sealed, the purpose of this bellows being to provide a compensating force on arm 15 variable in accordance with atmospheric pressure. Suitable spring means, not shown, within the bellows exerts an upward force tending to oppose the force of atmospheric pressure tending to collapse the bellows.

Variations in pressure of the gas within the bellows cause the arm 15 to assume an angular position variable in accordance with the pressure within the bellows in a known manner. The position of the arm may be measured electrically as by means of a potentiometer 23 which transmits the pressure indication externally of the housing through electric connections 24. The housing which encloses the pressure-sensitive equipment is preferably closed by a suitable cover member 25 for protection.

In order to prevent the pressure-sensing equipment from being damaged by vibration such as that caused by the aircraft propulsion machinery, it is customary to mount it on vibration-absorbing devices known as shock mounts. Thus, as shown in the drawing, the platform 14 is supported on the base member 10 by supporting legs including shock mounts 27 and 28 of known construction which permit relative vibratory movement between the base 10 and the platform 14.

While the shock mounts 27 and 28 function to insulate the pressure-sensing equipment from vibration, they give rise to another problem in that the flexible tube 20 interconnecting the bellows 18 and the conduit 21 is likely to experience severe vibration, particularly at resonant frequencies. This vibration may be sufficiently severe to cause structural failure of the tube 20 because of fatigue of the material of which it is formed.

In accordance with the present invention, there is provided a simple, but effective arrangement for damping the vibrations of the spiral pressure tube 20. As shown, this is accomplished by providing along the length of the tube a series of juxtaposed vibration dampers 29, which, in the embodiment of FIG. 1, are cylindrically shaped, loose-fitting sleeves having internal opening 30 through which the tube 20 extends. The diameter of opening 30 relative to the external diameter of the tube 20 is selected such that the dampers 29 are loosely mounted on the tube so as to be free to move laterally as well as along the length of the tube. The number of dampers used on the part of the tube to be damped is preferably selected in relation to the axial length of the dampers so that when equally spaced on the tube each damper is free to move a small amount axially along the tube relative to adjacent dampers. Each damper should be free to move axially along the tube as well as laterally of the tube to achieve optimum damping. This causes dissipation of kinetic energy of the tube by impact between the individual vibration dampers and the tube and between adjacent dampers as well as by friction between each damper and the tube and between adjacent dampers. While the weight of the dampers has not been found to be critical, it is believed that optimum vibration damping is obtained when the total mass of the vibration dampers is approximately equal to the vibrating mass of the tube. The dampers may be formed of either a rigid or a resilient material, tests having shown that both materials are effective. Particularly good results have been obtained utilizing dampers formed of silicone rubber, this material having an additional advantage that it is quiet and more wear resistant as compared with the dampers formed of metallic materials. The axial length of the individual dampers is selected in relation to the number of dampers desired, it being understood that there should be a sufficient number of individual dampers to achieve substantial energy dissipation by impact and frictional interaction between adjacent dampers as well as between the dampers and the tube on which they are mounted. As another factor, the axial length of the individual damper should be sufficiently short so that the dampers conform to the curved shape of the conduit or other flexible connector on which they are used for vibration damping without loss of freedom of movement in both lateral and axial directions.

Figure 3:
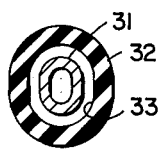
FIG. 3 is a cross-section view of a modified form of damper having an elongated cross section to conform to a conduit with an elongated cross section.

Occasionally, spiral pressure tubes may be used which have an elongated cross section 31 such as is illustrated in FIG. 3 of the drawing. In such a case the vibration dampers 32 are preferably elongated so that the contour of the opening 33 is complementary and corresponds generally to the external contour of the tube 31 so as to maximize the friction and impact contact areas between the dampers and the tube.

Figure 4:
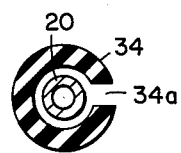
FIG. 4 is a cross-section view of another modified form of vibration damper.

When it is desired to install damper members on connectors already in place, it may be convenient to use dampers having a C-shaped cross section 34 illustrated in FIG. 4 of the drawing. The dampers are formed of a flexible material so as to permit easy installation by simply pushing the dampers in position over the tube. During this operation the axial opening 34a in the damper becomes enlarged sufficiently to permit tube 20 to pass therethrough during the installation but then closes sufficiently to hold the damper on the tube.

Figure 6:
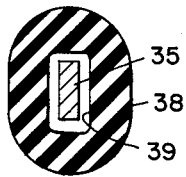
FIG. 6 is a cross-section view of a vibration damper taken along section line 6—6 of FIG. 5.
Figure 5:
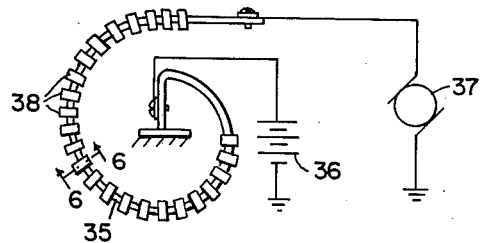
FIG. 5 shows a solid spiral connector to which vibration dampers may be applied in accordance with the present invention.

It will be understood that the vibration damping arrangement of the present invention is not limited in its application to flexible connectors that are tubular so as to provide pressure conduits. The invention is also applicable to flexible connectors that are solid. Such connectors may, for example, be used as flexible electrical conductors leading to electrical equipment shock mounted on a platform similar to platform 14 shown in FIG. 1. This use of the invention is illustrated in FIG. 5 of the drawing wherein a flexible connector 35 is formed of a solid spiral of resilient, electrically conducting material. Such a connector might, for example, be used to complete an electric circuit between a source of electric power such as a battery 36 and an electrical motor 37 supported on a shock-mounted platform. In order to prevent damaging vibration of the flexible connecting device 35, there are mounted along the length of the connector a series of vibration dampers 38 arranged in a manner similar to the dampers 29 of FIG. 1. As best shown in FIG. 6, each damper 38 preferably has a generally rectangular opening 39 conforming generally to the rectangular cross section of the flexible connector 35 for the purpose of maximizing the impact and frictional contact therebetween.

It will be understood that the invention is not limited to flexible connectors having a spiral configuration illustrated since the damping members will work equally well on flexible connectors having other configurations that will permit relative movement between the interconnected parts in all desired directions. An important advantage of the present invention is that the damping members may be applied easily to flexible connectors having all configurations regardless of the complexity of the curvature involved and without interfering with the flexibility of the connector.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. A flexible connecting device adapted to interconnect parts having relative vibratory movement comprising a resilient, flexible connector subject to vibration and vibration damping means for said connector, said vibration damping means comprising a plurality of juxtaposed vibration dampers mounted along the length of at least a part of said connector, said dampers being loosely mounted on said connector and spaced from each other so as to permit impact and frictional engagement between each damper and said connector and also between said adjacent dampers.

2. A flexible connecting device as set forth in claim 1 wherein the dampers are sleeves surrounding the connector.

3. A flexible connecting device as set forth in claim 1 wherein the connector has a tubular configuration formed in a spiral and the dampers are sleeves surrounding the connector.

4. A flexible connecting device as set forth in claim 1 wherein the connector has a tubular configuration and the dampers are sleeves surrounding the connector, the sleeves being formed of resilient material.

5. A flexible connecting device as set forth in claim 1 wherein the connector has a tubular configuration formed in a spiral and the dampers are sleeves formed of resilient material.

6. A pressure connection for interconnecting parts mounted for relative vibratory movement comprising a tube of resilient material curved to permit relative movement of said parts and damping means for damping vibratory movement of the tube, said damping means comprising a plurality of juxtaposed sleeves surrounding and disposed along said tube, said sleeves being loosely mounted on the tube and spaced from each other permitting impact and frictional engagement between each sleeve and the tube and between adjacent sleeves whereby kinetic energy of said tube due to vibratory movement thereof is dissipated and excessive vibration of the tube is prevented.

7. A pressure connection as set forth in claim 6 wherein the total mass of the sleeves is approximately equal to the mass of the vibratory portion of the tube.

8. A pressure conneciton as set forth in claim 6 wherein the inner opening in the sleeves has a curvature generally complementary to the outer curvature of the tube whereby to maximize the area of impact and frictional engagement between the sleeves and the tube.

9. A flexible connecting device adapted to interconnect parts having relative vibratory movement comprising a resilient flexible connecting member and damping means for damping the vibratory movement of said connecting member, said damping means comprising a series of juxtaposed sleeves surrounding and disposed along the connecting member in spaced relation with respect to said connecting member and with respect to each other permitting impact engagement between adjacent sleeves and between each sleeve and said flexible connector during a vibratory movement of said connector.

10. A flexible connecting device as set forth in claim 9 wherein the total mass of the sleeves is approximately equal to the mass of the vibratory portion of said connecting member.

11. A flexible connecting device comprising a resilient connecting member subject to vibration and damping means for damping the vibratory movement of said connecting member comprising a series of juxtaposed, loose-fitting sleeves surrounding and disposed along said connecting member in spaced relation with respect to each other.

References Cited in the file of this patent

UNITED STATES PATENTS

| | | |
|---|---|---|
| 2,036,811 | Jewell | Apr. 7, 1936 |
| 2,195,041 | Von Schlippe | Mar. 26, 1940 |
| 2,689,105 | Zimmer | Sept. 14, 1954 |

FOREIGN PATENTS

| | | |
|---|---|---|
| 685,503 | Great Britain | Jan. 7, 1953 |